United States Patent [19]

Schaffer et al.

[11] 4,351,640
[45] Sep. 28, 1982

[54] DYE POWDER FORMULATION

[76] Inventors: Ortwin Schaffer, 43 Bruesseler Ring; Manfred Herrmann, 23 Parkstrasse, both of 6700 Ludwigshafen, Fed. Rep. of Germany

[21] Appl. No.: 160,929

[22] Filed: Jun. 19, 1980

[30] Foreign Application Priority Data

Jul. 14, 1979 [DE] Fed. Rep. of Germany ....... 2928508

[51] Int. Cl.³ .............................................. D06P 67/02
[52] U.S. Cl. .......................................... 8/524; 8/526; 8/527; 8/549; 8/681; 8/687
[58] Field of Search ..................... 8/524, 526, 527, 549

[56] References Cited

U.S. PATENT DOCUMENTS

| 3,872,056 | 3/1975 | Daubach et al. | 8/527 |
| 4,078,885 | 3/1978 | Opitz et al. | 8/527 |
| 4,105,401 | 8/1978 | Koci et al. | 8/524 |
| 4,198,268 | 4/1980 | Frei et al. | 8/524 |

Primary Examiner—A. Lionel Clingman

[57] ABSTRACT

A powder formulation of the dye of the formula

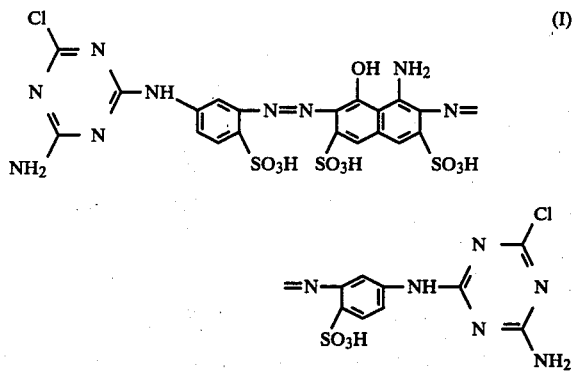

which contains sodium chloride and a condensate of β-naphthalenesulfonic acid with formaldehyde, or a sulfomethylation product which is obtained by condensing phenol, formaldehyde and a sulfite or bisulfite in the presence of sodium hydroxide, using a molar ratio of phenol: formaldehyde: sulfite or bisulfite: sodium hydroxide of 1:1.0–4:0.3–1.6:0.05–0.5.

The dye formulation is readily soluble in water and gives speck-free prints and dyeings, with a high color yield.

3 Claims, No Drawings

DYE POWDER FORMULATION

The present invention relates to a powder formulation of the chlorotriazine dye of the formula

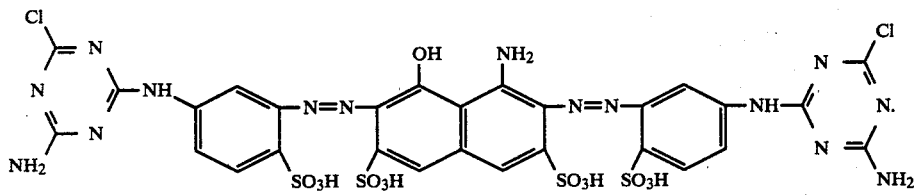

Powder formulations of reactive dyes are usually prepared by drying the salted-out dye in an oven and converting the dried lumpy material to a powder by milling, the powder then being standardized to a particular dye content by adding, for example, sodium chloride or sodium sulfate.

If this process is applied to the above dye, the formulations obtained are insufficiently soluble in water and when used for printing and continuous dyeing, give pale and speckled products.

It is an object of the present invention to provide a formulation of the dye (I) which does not suffer from the adverse properties of the prior art formulations.

We have found that this object is achieved and that a powder formulation of the dye of the formula (I) which is very suitable for printing and continuous dyeing is obtained by compounding, based on (a+b+c), (a) from 10 to 65% by weight of the dye of the formula I,
(b) from 5 to 25% by weight of sodium chloride, and
(c) from 10 to 85% by weight of a condensate of β-naphthalenesulfonic acid and formaldehyde, or of a sulfomethylation product which is obtained by condensing phenol, formaldehyde and a sulfite or bisulfite, in the presence of sodium hydroxide, in a molar ratio of phenol:formaldehyde:sulfite or bisulfite:sodium hydroxide of 1:1.0–4:0.3–1.16:0.05–0.5, with or without
(d) other ingredients conventionally present in powder formulations.

The novel formulations can be readily dissolved by simply stirring them into water. In contrast to the prior art formulations, they are very soluble. They give speck-free prints and continuous dyeings, with high color yields in both cases.

Preferred formulations contain from 30 to 65, especially from 45 to 65, % by weight of the dye of the formula I.

The novel formulations are obtained in a conventional manner by homogenizing or dissolving the dye (I) in water in the presence of the stated anionic dispersant and then spray-drying the solution or suspension, with hot air entry temperatures of from 100° C. to 200° C. The starting dye may be used in the form of a dry powder or, preferably, in the form of the filter cake obtained from the process of synthesis.

The anionic dispersants of the β-naphthalenesulfonic acid/formaldehyde condensate type are known. They contain 2 or more naphthalene radicals bonded to one another by methylene groups, and the naphthalene radicals as a rule carry 1 sulfonic acid group each (cf. Schwartz-Perry "Surface Active Agents" Volume I, p. 119, Interscience Publishers Inc., New York 1949).

The dispersants (c) of the sulfomethylation product type are described in German Pat. No. 2,301,638. The sulfomethylation product described in Example 4 of the said German Patent has proved particularly suitable for use with the dye (I).

Examples of other ingredients (d), conventionally present in powder formulations, are wetting agents, which accelerate the wetting of the powder formulation when it is stirred into water, and anti-dust agents. The amount of (d) can as a rule be up to 10, preferably up to 5, % by weight, based on (a+b+c).

The sodium chloride contained in the formulation originates from the process of isolation of the dye, after its synthesis.

The Examples which follow illustrate the novel formulations. Parts and percentages in the Examples are by weight.

EXAMPLE 1

77 parts of the dye of the formula

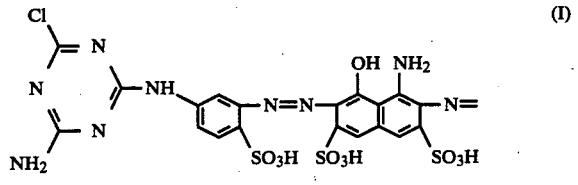

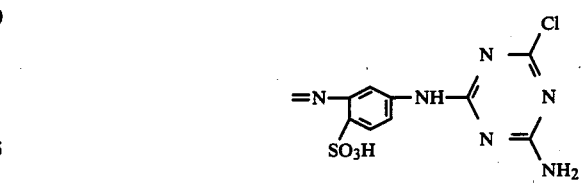

(calculated as dry material) in the form of the filter cake, and 23 parts of a condensate of naphthalene-sulfonic acid and formaldehyde (in the form of the sodium salt) are worked into a slurry with sufficient water to give a 20% solids content of the suspension. The latter is then dried in a spray tower, using a two-material nozzle (hot air entry temperature: 200° C.). The formulation obtained contains 61% of dye (I), 16% of sodium chloride and 23% of a condensate of naphthalenesulfonic acid and formaldehyde.

96% by weight of the powder formulation consist of spherical particles smaller than 20 μm.

EXAMPLE 2

77 parts of the dye mentioned in Example 1 (calculated as dry material), 8 parts of sodium chloride and 15 parts of the dispersant obtainable in accordance with Example 4 of German Pat. No. 2,301,638 are stirred with sufficient water to give a suspension of 18% solids content. The suspension is then dried in a spray tower (air entry temperature: 220° C.). The formulation contains 60% of dye (I), 25% of sodium chloride and 15% of dispersant.

90% by weight of the powder formulation consist of spherical particles smaller than 20 μm.

COMPARATIVE EXAMPLE 1

The procedure followed is as described in Example 1, except that the condensate of β-naphthalenesulfonic acid and formaldehyde is replaced by dry sodium sulfate. After spray-drying, a powder formulation is obtained, of which 70% by weight are particles smaller than 20 μm.

COMPARATIVE EXAMPLE 2

77 parts of the dye mentioned in Example 1 are converted to a powder by drying in an oven and then milling in a pin-disk mill, and this powder is homogeneously dry-blended with 23 parts of sodium sulfate.

8% by weight of the powder formulation consist of inhomogeneous particles smaller than 20 μm.

The following tests were carried out with the dye formulations obtained in accordance with the preceding Examples:

(a) Solubility in water

X g of dye were introduced into 1 liter of H₂O at 60° C. and the mixture was stirred for 5 minutes at 1,000 rpm. The solution was then suction filtered through 2 filters ($\phi$ 90 mm; Schleicher und Schüll No. 1450 CV) (pressure in the receiver: about 20 mm Hg). The solubility was recorded as the maximum amount of dye which did not produce any residue on the filters.

(b) Color depth of a print

Print paste:

6 g of a dye formulation per 1,000 g of Algum S 15 thickener.

Material: Bleached cotton fabric.

The color yield was determined spectrophotometrically from the reflectance.

(c) Speck content

The speck content was assessed visually from microphotographs of the print paste.

Using the formulations of Examples 1 and 2 and of Comparative Examples 1 and 2, the results shown in the Table were obtained:

| Formulation | Solubility | Depth of color | Speck content |
| --- | --- | --- | --- |
| Comparative Example 1 | 55 g/l | 100% | some specks |
| Comparative Example 2 | 45 g/l | 90% | very many large specks |
| Example 1 | 75 g/l | 136% | no specks |
| Example 2 | 70 g/l | 125% | a few specks |

We claim:

1. A powder formulation of the dye of the formula

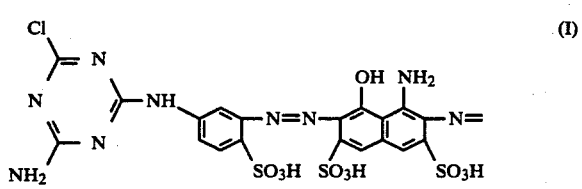

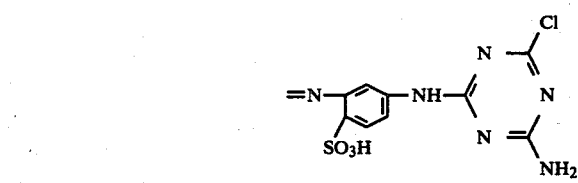

which contains, based on (a+b+c),
(a) from 10 to 65% by weight of the dye of the formula I,
(b) from 5 to 25% by weight of sodium chloride, and
(c) from 10 to 85% by weight of a condensate of β-naphthalenesulfonic acid and formaldehyde, or of a sulfomethylation product which is obtained by condensing phenol, formaldehyde and a sulfite or bisulfite, in the presence of sodium hydroxide, in a molar ratio of phenol:formaldehyde:sulfite or bisulfite:sodium hydroxide of 1:1.0–4:0.3–1.6:0.05–0.5.

2. A formulation as claimed in claim 1, which contains from 0 to 10% by weight, based on (a+b+c), of wetting agents, anti-dust agents or mixtures of these.

3. A formulation as claimed in claim 1 or 2, which contains from 45 to 65% by weight of the dye (I).

* * * * *